(12) United States Patent
Hayashi et al.

(10) Patent No.: US 7,207,351 B2
(45) Date of Patent: Apr. 24, 2007

(54) SWITCHING VALVE WITH POSITION DETECTING MECHANISM

(75) Inventors: Bunya Hayashi, Tsukuba-gun (JP);
Shinji Miyazoe, Tsukuba-gun (JP);
Shinichi Yoshimura, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 11/338,695

(22) Filed: Jan. 25, 2006

(65) Prior Publication Data
US 2006/0169334 A1    Aug. 3, 2006

(30) Foreign Application Priority Data
Jan. 31, 2005    (JP) .............................. 2005-023811

(51) Int. Cl.
*F16K 37/00* (2006.01)
*F16K 31/12* (2006.01)

(52) U.S. Cl. .................. 137/554; 137/553; 251/30.01; 251/285; 251/366

(58) Field of Classification Search ............... 137/553, 137/554; 251/30.01, 285, 366
See application file for complete search history.

(56) References Cited

U.S. PATENT DOCUMENTS 4,004,258 A * 1/1977 Arnold ........................ 335/17
4,341,241 A * 7/1982 Baker ......................... 137/554
4,478,345 A * 10/1984 Edinger ....................... 220/724
5,329,956 A * 7/1994 Marriott et al. ........... 137/15.01
6,481,460 B2 * 11/2002 Fukano et al. .............. 137/554

FOREIGN PATENT DOCUMENTS

| EP | 1 195 528 B1 | 4/2002 |
| JP | 2001-193845 | 7/2001 |
| JP | 2001-193846 | 7/2001 |

* cited by examiner

*Primary Examiner*—A. Michael Chambers
(74) *Attorney, Agent, or Firm*—Oblon, Spivak, McClelland, Maier & Neustadt, P.C.

(57) ABSTRACT

In a switching valve containing a valve member for opening and closing a valve seat and a piston for driving the valve member by the action of a pilot fluid pressure inside a valve housing, a magnet for positional detection is attached to the piston, two sensor attachment grooves extending in the direction of the axial line L of the switching valve and having different groove lengths in accordance with the operational position are formed in parallel on the side face of the valve housing, and magnetic sensors are attached at locations on the side of the innermost end wall in the attachment grooves.

20 Claims, 4 Drawing Sheets

SWITCHING VALVE WITH POSITION DETECTING MECHANISM

TECHNICAL FIELD

The present invention relates to a switching valve with a positional detection mechanism for detecting the position of a valve member opening and closing a valve seat by using a magnet and magnetic sensors.

BACKGROUND ART

Up to now, as described in the following Patent Document 1 and Patent Document 2, for example, a pilot operated switching valve constructed such that a valve member for opening and closing a valve seat in a flow path is driven by a piston operated by the action of a pilot fluid pressure is publicly known. In such a switching valve, although not described in the above documents in particular, a magnet and magnetic sensors are used to detect the operational position of the valve member and the operational position of the valve member is indirectly detected by detecting the operational position of the piston. That is, the magnet is attached to the piston, the magnetic sensors are attached to the housing of the switching valve, and the operational position of the piston is detected by the magnet and the magnetic sensors.

Then, as a method for attachment of the magnetic sensors to the housing, generally, as shown in FIG. 7, two attachment grooves 101 and 101 are formed in parallel on the side face of the housing, magnetic sensors 102a and 102b are attached at different positions from each other in the direction of the coaxial line, one magnetic sensor 102a detects the position where the piston reaches a valve closing position, and the other magnetic sensor 102b detects the piston where the piston reaches a valve opening position. These positional detection signals are input to a control system and the signals are used as a control signal.

Patent Document 1: Japanese Unexamined Patent Application Publication No. 2001-193845

Patent Document 2: Japanese Unexamined Patent Application Publication No. 2001-193846

Then, in the conventional switching valve, the two attachment grooves 101 and 101 are formed over the whole length on the side face of the housing so as to have the same length and the magnetic sensors 102a and 102b are attached therein such that the position of the magnetic sensors 102a and 102b is displaced from each other so as to be able to detect the valve closing position and the valve opening position. However, since it is difficult to find the positioning target, it is troublesome, and, in addition, it was easy to make an error of attaching the magnetic sensor for detection of the valve closing position and the magnetic sensor for detection of the valve opening position to opposite positions.

DISCLOSURE OF INVENTION

Then, it is an object of the present invention to provide a switching valve in which two magnetic sensors for detection of the valve closing position and for detection of the valve opening position can be simply and securely attached to fixed positions of two attachment grooves formed in a valve housing without confusing the positions and whose working properties and safety are excellent.

In order to attain the above object, according to the present invention, a switching valve comprises a valve member for opening and closing a valve seat in a flow path, the valve member inside a valve housing; and a piston for driving the valve member by the action of a pilot fluid pressure, the piston inside the valve housing. In the switching valve, a magnet for positional detection is attached to the piston, two sensor attachment grooves extending in the operational direction of the piston and being different in groove length from each other in accordance with the operational positions of the piston are formed in parallel, and magnetic sensors are attached at positions on the side of the innermost end wall in the attachment grooves.

In the present invention, it is desirable that the difference in length between the two attachment grooves be substantially the same as the operational stroke of the piston.

Furthermore, in the present invention, the valve housing contains a first housing portion having the valve member and a second housing portion having the piston, the two attachment grooves are formed on the side face of the second housing portion in the direction from the side of one end in the direction of the axial line of the switching valve to the side of the other end, the long attachment groove is extended to a position corresponding to the position of the piston where the valve seat is closed by the valve member, and the short attachment groove is extended to a position corresponding to the position of the piston where the valve seat is fully opened by the valve member.

In the present invention, preferably the two attachment grooves are formed on each of two side faces, facing each other, of the valve housing.

Furthermore, in another embodiment of the present invention, the length of the two attachment grooves is determined by attachment of stoppers formed separately from the valve housing.

According to the present invention, since the length of two attachment grooves are made different from each other in accordance with the operational position of the piston, when a magnetic sensor is attached to each attachment groove, it is able to attach the two magnetic sensors to fixed positions easily and securely without confusing the positions by positioning the magnetic sensors by aiming at the innermost end wall of the attachment groove, and the working properties and the safety are excellent.

BEST MODE FOR CARRYING OUT THE INVENTION

Figure 1:
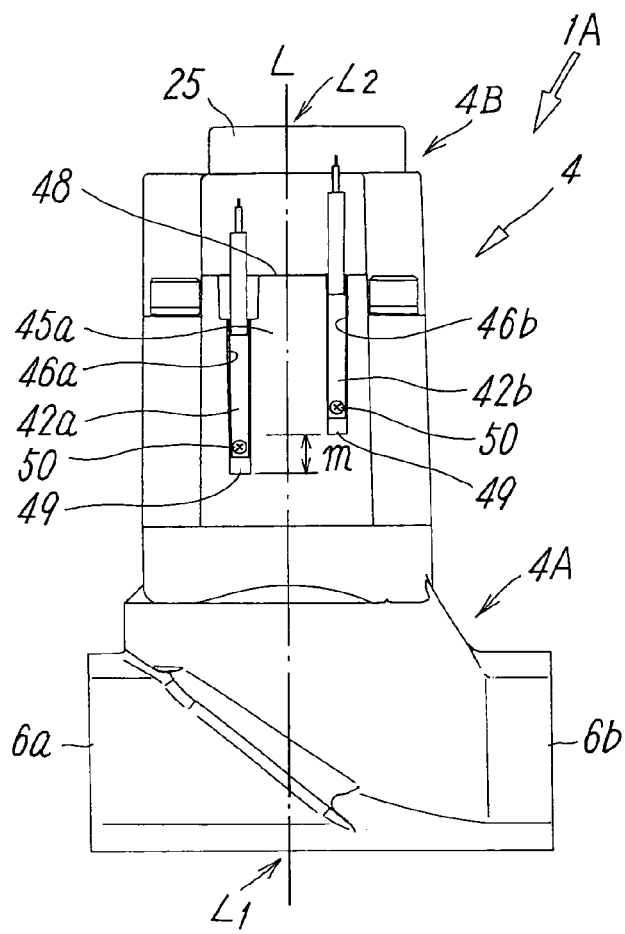
FIG. 1 is a side view showing a first embodiment of a switching valve according to the present invention.
Figure 2:
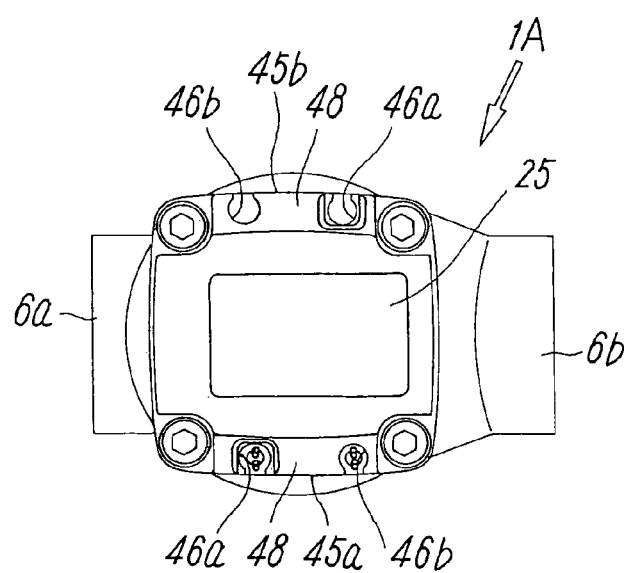
FIG. 2 is a top view of the switching valve shown in FIG. 1.
Figure 3:
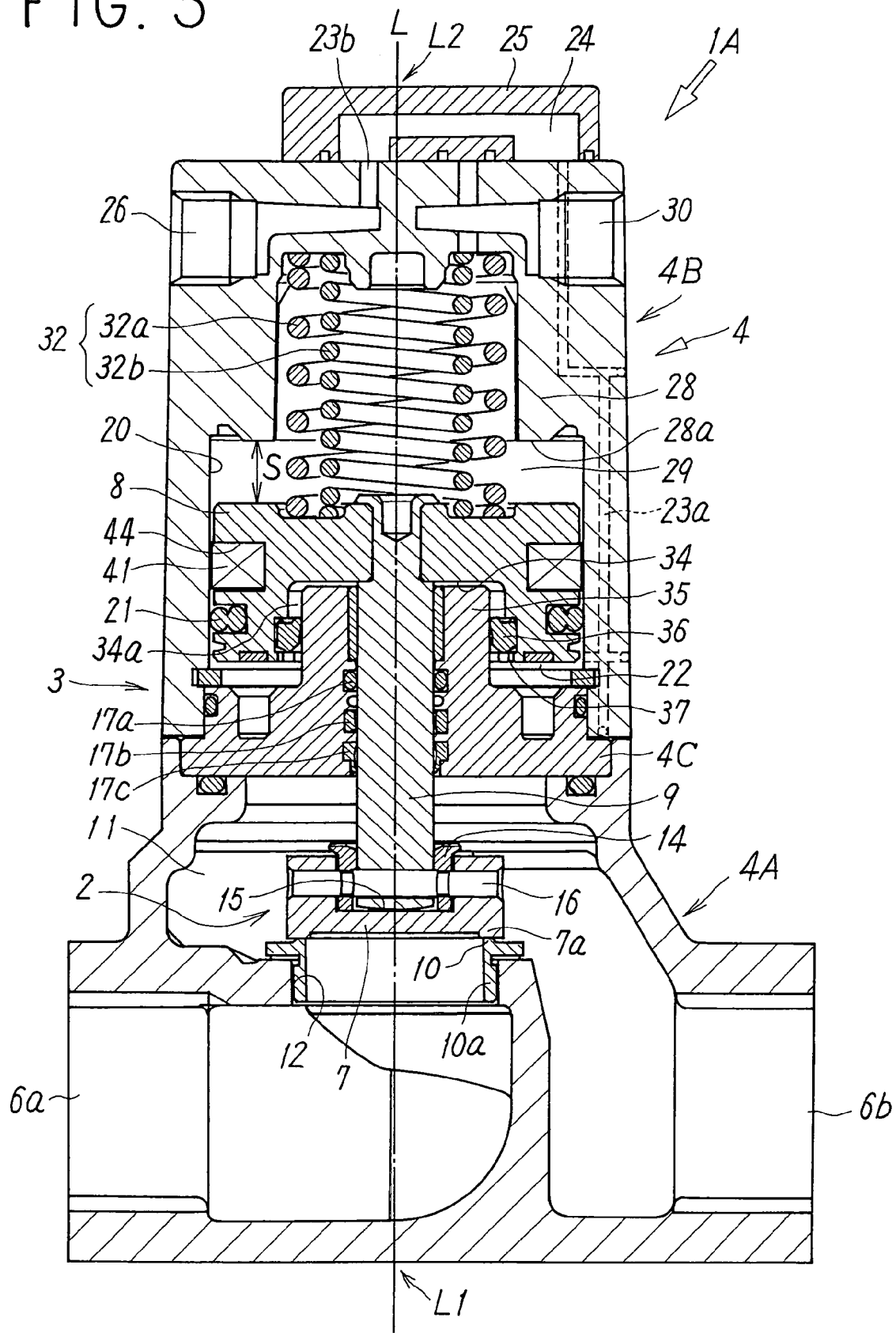
FIG. 3 is a sectional view of the switching valve shown in FIG. 1.

FIGS. 1 to 3 show a first embodiment of a switching valve with a positional detection mechanism according to the present invention. This switching valve 1A is a pilot operated two-port switching valve, and a valve member 7 for opening and closing the flow path between two main ports 6a and 6b is driven by a piston 8 being operated by the action of a pilot fluid pressure.

A valve housing 4 of the above switching valve is composed of a first housing portion 4A and a second housing portion 4B joined together in the direction of the axial line L of the switching valve 1A through a partition member 4C. A valve opening and closing portion 2 having the valve member 7 is contained in the first housing portion 4A positioned on the side of a first end L1 in the direction of the axial line L, a cylinder operation portion 3 having the piston 8 is contained in the second housing portion 4B positioned on the side of a second end L2, opposite to the first end L1, and both the valve member 7 and the piston 8 are positioned on the axial line L.

The valve opening and closing portion 2 contains a first main port 6a and a second main port 6b which are formed on both side faces facing each other of the first housing portion 4A and made open in the directions being 180 degrees different from each other, a ring-shaped valve seat 10 provided in the flow path connecting both the main ports. 6a and 6b, and the poppet type valve member 7 for opening and closing the valve seat 10 in a valve chamber 11 connected to the second main port 6b.

The valve seat 10 is formed in the upper end portion of a cylindrical member 10a made of a rigid material such as a metal, synthetic resin, etc., and the cylindrical member 10a is put in the flow path hole 12 inside the first housing portion 4A.

The valve member 7 is made of a disk-shaped member of rubber, synthetic resin, metal, etc., and contains a ring-shaped seal portion 7a attachable to and removable from the valve seat 10 around the outer periphery on its lower surface, and the valve member 7 is attached to the end of a rod 9 extending from the piston 8 in the cylinder operation portion 3 to the valve chamber 11 through the partition member 4C. The attachment is performed in such a way that the end of the rod 9 having an elastic cap 14 of rubber or synthetic resin put thereon is inserted in an attachment hole 15 formed in the middle of the back side of the valve member 7 and that the rod 9 and the valve member 7 are latched to each other by using a pin 16.

Reference numerals 17a, 17b, and 17c in the drawing represent seal members for sealing the gap between the inner surface of the partition member 4 and the outer surface of the rod 9.

The cylinder operation portion 3 contains a circular cylinder hole 20 formed inside the second housing portion 4B having a substantially rectangular section and the piston 8 provided inside the cylinder hole 20 so as to freely slide in the direction of the axial line L through a seat member 21, and the end portion of the rod 9 is joined to the middle of the piston 8.

A pilot pressure chamber 22 is formed between the piston 8 and the partition member 4C, and the pilot pressure chamber 22 is connected to a pilot port 26 which is made open on the side face of the second housing portion 4B through a first pilot flow path extending to the top surface inside the second housing portion 4B, an auxiliary flow path 24 inside a plate 25 attached to the top surface of the second housing portion 4B, and a second pilot flow path 23b extending to the top surface inside the second housing portion 4B. Then, as shown in FIG. 1, when the valve seat 10 is closed by the valve member 7, that is, when the piston 8 is situated in a first position as a valve closing position, the piston is operated upward and the valve member 7 is made to break away from the valve seat 10 by supplying a pilot fluid such as air, etc., from the pilot port 26 to the pilot pressure chamber 22, and the valve seat 10 is opened. At this time, the piston 8 moves to the position (a second position) where the piston comes in contact with the contact portion 28a at the lower end of a lid wall 28 covering the upper end of the second housing portion 4B and stops at the position, the valve seat is fully opened. Accordingly, the second position of the piston 8 is the valve opening position.

A chamber 29 on the side of the back surface of the piston 8, that is, a chamber formed between the piston 8 and the lid wall 28 of the second housing portion 4B is a breathing chamber where the outside air can freely go in and out through a breathing port 30, and a return coil spring 32 is provided in the breathing chamber 29. This return spring 32 is made of a large diameter spring 32a and a small diameter spring 32b and these springs 32a and 32b are coaxially provided between the back surface of the piston 8 and the lid wall 28. Then, while the piston 8 is situated at the second position, when the pilot fluid in the pilot pressure chamber 22 is discharged, the piston returns to the first position as a valve closing position by the spring force of the return spring 32.

A buffer mechanism is provided in order that the valve member 7 may be softly seated on the valve seat at the return operation of the piston 8. The buffer mechanism is composed of a concave portion 34 formed in the piston 8, a convex wall portion 35 to be mated with the concave portion 34 formed in the partition member 4C, a unidirectional seal member 36 provided on the inner surface of the concave portion 34, and a bypath flow path 37 linking the spaces on both sides in the axial direction of the seal member 36 so as to take a long way around the outer surface of the seal member 36. The sectional area of the bypass flow path 37 is smaller than the sectional area of the pilot flow path 23a.

Then, after the piston 8 has started the return stroke from the second position as a valve opening position, until the convex wall portion 35 is mated with the inner portion of the seal member 36, although the pilot fluid in the pilot pressure chamber 22 is being discharged through the pilot flow path 23a, but when the convex wall portion 35 has been mated with the inner portion of the seal member 36, a buffer chamber 34a is formed by the convex wall portion 35 and the seal member 36 behind the concave portion 34 and the fluid in the buffer chamber 34a flows out into the pilot pressure chamber 22 while the amount of flow is limited by the bypass flow path 37 having a small sectional area. Therefore, the return speed of the piston 8 is decreased and the valve member 7 is slowly seated in a buffered state on the valve seat 10.

When the seal member 36 is in contact with the convex wall portion 35, the seal member 36 cuts off only the flow of the pilot fluid flowing to the pilot pressure chamber 22 from the side of the buffer chamber 34a and allows the flow in the opposite direction.

Furthermore, a positional detection mechanism for detecting the operational position of the piston when the valve sea is opened and closed by the valve member 7 is provided in the switching valve 1A. In the positional detection mechanism, the operational position of the piston 8 id detected by using a magnet 41 and two magnetic sensors 42a and 42b.

That is, a concave groove 44 is formed at a position on the side of the breathing chamber 29 from the mounting position of the seal member 21 and the ring-shaped magnet 41 is attached in the concave groove 44.

On the other hand, two sensor attachment grooves 46a and 46b linearly extending in the operational direction of the piston 8, that is, in the direction of the axial line of the switching valve, parallel to each other, are formed in one or both of the two side faces 45a and 45b, facing each other, of the second housing portion 4B in the valve housing 4. The attachment grooves 46a and 46b are formed from the end portion on the side of the second end L2 along the axial line L of the side faces 45a and 45b to the side of the first end L1 on its opposite side, that is, the grooves 46a and 46b are formed downward from the upper end of the side faces 45a and 45b to the side of the first housing portion 4A, and the length of the grooves are different in accordance with the operational positions of the piston 8. That is, the first attachment groove 46a having a long groove is extended to a position corresponding to the position (first position) of the piston 8 when the valve seat 10 is closed by the valve member 7 and the second attachment groove 46b having a short groove is extended to a position corresponding to the position (second position) of the piston 8 when the valve seat 10 is fully opened by the valve member 7. The difference in length (m) of the attachment grooves 46a and 46b is substantially the same as the stroke S in which the piston moves between the first position and the second position, and the difference is also the same as the stroke in which the valve seat 10 is opened and closed by the valve member 7.

A step portion 48 is formed in the upper end portion of the side faces 45a and 45b of the second housing portion 4B, the upper end portion of the attachment grooves 46a and 46b are made open at the step portion 48, and the magnetic sensors 42a and 42b are inserted from here.

Furthermore, the direction of the side faces 45a and 45b in which the attachment grooves 46a and 56b are formed is 90 degrees difference from the direction of the two main ports 6a and 6b provided in the first housing portion 4A.

Moreover, in the following description, unless the two side faces 45a and 45b, the two attachment grooves 46a and 46b, and the two magnetic sensors 42a and 42b are required to distinguish between them, the side face is shown by a common mark 45, the attachment groove is shown by a common mark 46, and the magnetic sensor is shown by a common mark 42.

The magnetic sensors 42a and 42b are housed inside the two attachment grooves 46a and 46b and the magnetic sensors 42a and 42b are fixed at a location where the magnetic sensors 42a and 42b are in contact with or close to the innermost end wall 49 of the attachment groove 46 by using a fixing screw. When the piston 8 is at the first position, the first magnetic sensor 42a attached inside the first attachment groove 46a senses the magnet 41 and detects the piston 8 and the first magnetic sensor 42a is a sensor for detecting the valve closing position, and, when the piston 8 is at the second position, the second magnetic sensor 42b attached inside the second attachment groove 46b senses the magnet 41 and detects the piston 8 and the second magnetic sensor 42b is a sensor for detecting the valve opening position.

As is understood from FIG. 2, the attachment groove 46 has a section in which the groove width on the groove opening side is narrower than the groove width on the groove bottom side, the magnetic sensor 42 is in a cylindrical shape the diameter of which is larger than the width of the groove opening of the attachment groove 46, the magnetic sensor 42 is inserted in the attachment groove 46 from its upper end portion, and the magnetic sensor 42 is fixed by being pushed to the groove opening side of the attachment groove 46 in such a way that the fixing screw 50 of the magnetic sensor 42 is driven until the tip of the magnetic sensor 42 is in contact with the groove bottom of the attachment groove 46. Accordingly, the attachment position of the magnetic sensor 42 can be adjusted along the attachment groove 46 by loosening the fixing screw 50.

The positional adjustment of the magnetic sensor 42 is performed while having the innermost end wall 49 of the attachment groove 46 as an aim. At that time, since the length of the two attachment grooves 46a and 46b is made different so as to be in agreement with the operational positions of the piston 8, when the position is determined while aiming at the innermost end wall 49 on each of the attachment grooves 46a and 46b, the two magnetic sensors 42a and 42b can be easily and securely attached at fixed locations without making an error in their positional relation, and the working properties and the safety are excellent.

Moreover, when the attachment grooves 46 are provided on the two side faces 45a and 45b facing each other of the second housing portion 4B, it is desirable that the disposition of the two attachment grooves 46 be the same on both side faces 45a and 45b in such a way that, for example, as shown in the drawing, the long first attachment groove 46a is disposed on the left side and the short second attachment groove 46b is disposed on the right side.

Figure 4:
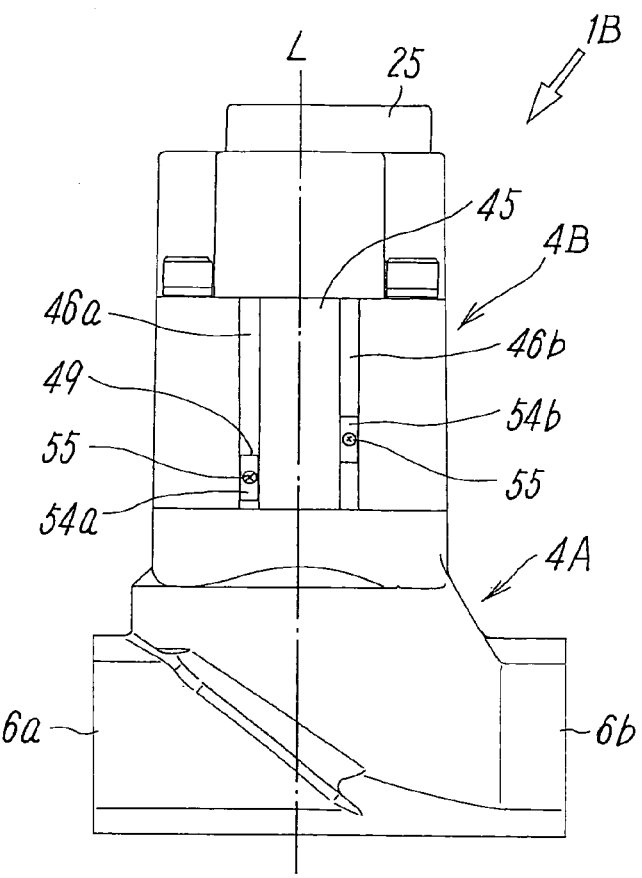
FIG. 4 is a side view showing a second embodiment of the switching valve according to the present invention.

FIG. 4 shows a second embodiment of the present invention. In the switching valve 1A of the first embodiment, the two attachment grooves 46a and 46b are formed on the side face 45 of the second housing portion 4B so as to extend from the upper end portion to the positions in the middle in the direction of the axial line L. However, in the switching valve 1B of the second embodiment, the two attachment grooves 46a and 46b are formed so as to extend over the whole length in the direction of the axial line of the side face 45 of the second housing portion 4B and the groove length of the two attachment grooves 46a and 46b is set to be different from each other in such a way that stoppers 54a and 54b formed differently from the valve housing 4 are attached at different positions from each other inside the attachment grooves 46a and 46b. Accordingly, in this case, the innermost end walls 49 as aims when the magnetic sensors 42 are positioned are formed by the stoppers 54a and 54b.

The stoppers 54a and 54b are cylindrical and have a thickness not allowing the stoppers 54a and 54b to come out of the attachment grooves 46 in the direction of the groove opening. The stoppers 54a and 54b are inserted into the attachment grooves 46 from the side of the upper end portion of the grooves, and the stoppers 54a and 54b are fixed by pressing them on the side of the groove opening of the attachment groove 46 in such a away that the fixing screw 55 of (each of) the stoppers 54a and 54b is driven until the end of the stoppers 54a and 54b comes in contact with the groove bottom of the attachment groove 46. Accordingly, the position of the stoppers 54a and 54b can be adjusted by loosening the fixing screw 55.

In this case, the length of the two stoppers 54a and 54b may be the same as each other or different from each other. When the length is different from each other, the stoppers 54a and 54b can be also fixed such that their one end is in contact with the upper end of the first housing portion 4A.

Figure 5:
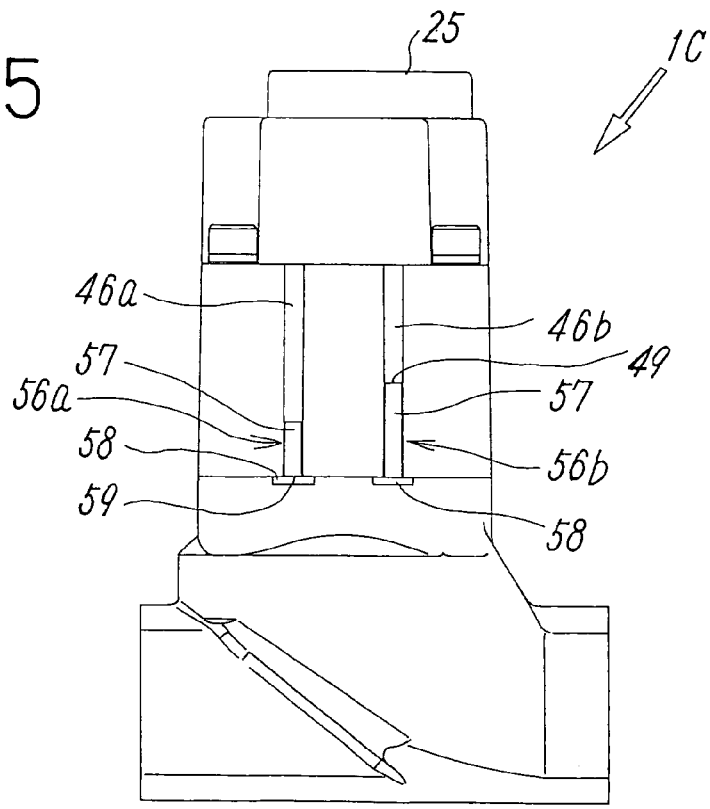
FIG. 5 is a side view showing a third embodiment of the switching valve according to the present invention.
Figure 6:
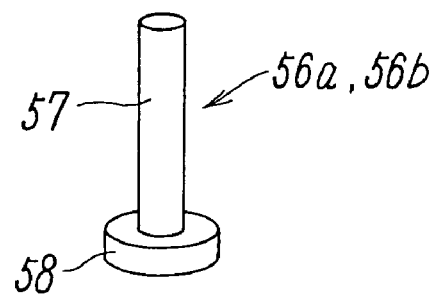
FIG. 6 is a perspective view of a stopper.
Figure 7:
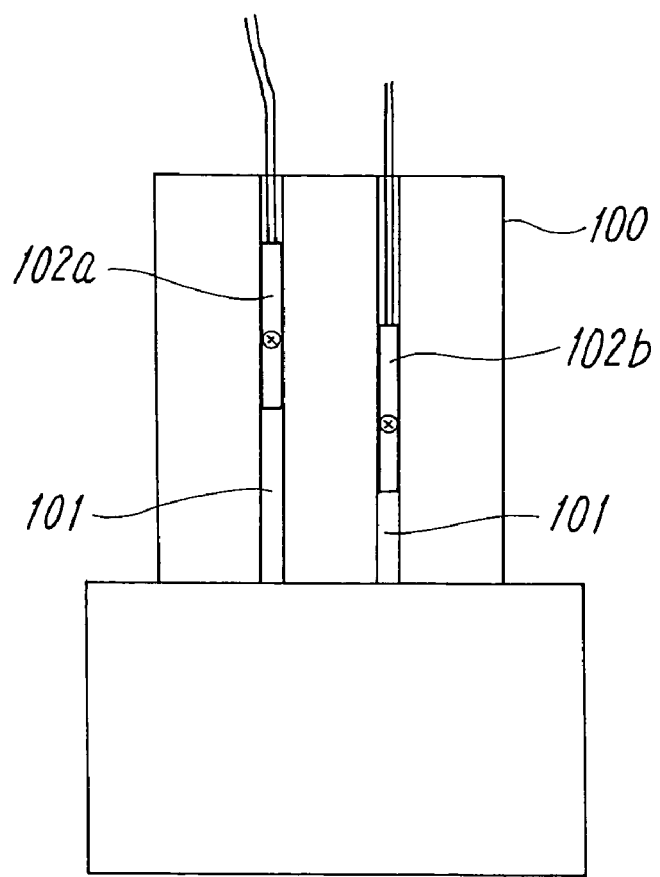
FIG. 7 is a side view of a conventional switching valve.

FIG. 5 shows a third embodiment of the present invention. In a switching valve 1C of the third embodiment, in the same way as in the switching valve 1B of the second embodiment, the length of the attachment grooves 46a and 46b is set by using stoppers 56a and 56b. However, the construction of the stoppers 56a and 56b is different from the stoppers 54a and 54b of the second embodiment. That is, as shown in FIG. 6, each of the stoppers 56a and 56b in the switching valve 1C of the third embodiment is composed of a long and narrow axial portion to be inserted into the attachment groove 46 and a flange-shaped head portion 58 which is larger in diameter than the axial portion 67. The stoppers 56a and 56b are attached in the attachment grooves 46 such that the head portion 58 is mated with a concave portion 59 formed in the lower end portion of the attachment groove 46 between the first housing portion 4A and the second housing portion 4B and the head portion 58 and the concave portion 59 are latched to each other. Accordingly, in the third embodiment, it is not required to fix the stoppers 56a and 56b by using screws.

In the two stoppers 56a and 56b, the length of the axial portion 57 is different from each other, the axial portion of the first stopper 56a for setting the length of the first attachment groove 46a having a long groove is short, and the axial portion 57 of the second stopper 56b for setting the length of the second attachment groove 46b having a short groove is long.

Except for the above construction in the second and third embodiments, since the other is practically the same as that in the first embodiment, the same main construction portions as in the first embodiment are given the same reference numerals as the first embodiment and their description is omitted.

The invention claimed is:

1. A switching valve comprising:
   a valve member for opening and closing a valve seat in a flow path, the valve member inside a valve housing; and
   a piston for driving the valve member by the action of a pilot fluid pressure, the piston inside the valve housing,
   wherein a magnet for positional detection is attached to the piston, two sensor attachment grooves extending in the operational direction of the piston and being different in groove length from each other in accordance with the operational positions of the piston are formed in parallel on a side face of the valve housing, and magnetic sensors are attached at positions on the side of the innermost end wall in the attachment grooves.

2. A switching valve as claimed in claim 1, wherein the difference in length between the two attachment grooves is substantially the same as the operational stroke of the piston.

3. A switching valve as claimed in claim 2, wherein the valve housing contains a first housing portion having the valve member and a second housing portion having the piston, the two attachment grooves are formed on the side face of the second housing portion in the direction from the side of one end in the direction of the axial line of the switching valve to the side of the other end, the long attachment groove is extended to a position corresponding to the position of the piston where the valve seat is closed by the valve member, and the short attachment groove is extended to a position corresponding to the position of the piston where the valve seat is fully opened by the valve member.

4. A switching valve as claimed in claim 3, wherein the two attachment grooves are formed on each of two side faces, facing each other, of the valve housing.

5. A switching valve as claimed in claim 4, wherein the length of the two attachment grooves is determined by attachment of stoppers formed separately from the valve housing.

6. A switching valve as claimed in claim 3, wherein the length of the two attachment grooves is determined by attachment of stoppers formed separately from the valve housing.

7. A switching valve as claimed in claim 2, wherein the two attachment grooves are formed on each of two side faces, facing each other, of the valve housing.

8. A switching valve as claimed in claim 7, wherein the length of the two attachment grooves is determined by attachment of stoppers formed separately from the valve housing.

9. A switching valve as claimed in claim 2, wherein the length of the two attachment grooves is determined by attachment of stoppers formed separately from the valve housing.

10. A switching valve as claimed in claim 9, wherein the length of the attachment grooves can be adjusted by adjustment of the position of the stoppers.

11. A switching valve as claimed in claim 9, wherein the stoppers having different lengths are used in the two attachment grooves.

12. A switching valve as claimed in claim 1, wherein the valve housing contains a first housing portion having the valve member and a second housing portion having the piston, the two attachment grooves are formed on the side face of the second housing portion in the direction from the side of one end in the direction of the axial line of the switching valve to the side of the other end, the long attachment groove is extended to a position corresponding to the position of the piston where the valve seat is closed by the valve member, and the short attachment groove is extended to a position corresponding to the position of the piston where the valve seat is fully opened by the valve member.

13. A switching valve as claimed in claim 12, wherein the length of the two attachment grooves is determined by attachment of stoppers formed separately from the valve housing.

14. A switching valve as claimed in claim 12, wherein the two attachment grooves are formed on each of two side faces, facing each other, of the valve housing.

15. A switching valve as claimed in claim 14, wherein the length of the two attachment grooves is determined by attachment of stoppers formed separately from the valve housing.

16. A switching valve as claimed in claim 1, wherein the two attachment grooves are formed on each of two side faces, facing each other, of the valve housing.

17. A switching valve as claimed in claim 16, wherein the length of the two attachment grooves is determined by attachment of stoppers formed separately from the valve housing.

18. A switching valve as claimed in claim 1, wherein the length of the two attachment grooves is determined by attachment of stoppers formed separately from the valve housing.

19. A switching valve as claimed in claim 18, wherein the length of the attachment grooves can be adjusted by adjustment of the position of the stoppers.

20. A switching valve as claimed in claim 18, wherein the stoppers having different lengths are used in the two attachment grooves.

* * * * *